US008442797B2

(12) United States Patent
Kim et al.

(10) Patent No.: US 8,442,797 B2
(45) Date of Patent: May 14, 2013

(54) DIRECTIONAL TAP DETECTION ALGORITHM USING AN ACCELEROMETER

(75) Inventors: Dong Yoon Kim, Ithaca, NY (US); Scott A. Miller, Groton, NY (US)

(73) Assignee: Kionix, Inc., Ithaca, NY (US)

( * ) Notice: Subject to any disclaimer, the term of this patent is extended or adjusted under 35 U.S.C. 154(b) by 482 days.

(21) Appl. No.: 12/750,480

(22) Filed: Mar. 30, 2010

(65) Prior Publication Data

US 2010/0256947 A1 Oct. 7, 2010

Related U.S. Application Data

(60) Provisional application No. 61/164,784, filed on Mar. 30, 2009.

(51) Int. Cl.
*G01P 15/00* (2006.01)

(52) U.S. Cl.
USPC ............. 702/141; 702/41; 702/124; 340/669; 177/25.14; 342/357.51; 345/158

(58) Field of Classification Search .................. 702/141, 702/41, 124; 455/418, 550.1; 701/1; 340/669; 177/25.14; 342/357.51; 345/158, 156, 173
See application file for complete search history.

(56) References Cited

U.S. PATENT DOCUMENTS

2002/0109673 A1 8/2002 Valet
2005/0219213 A1 10/2005 Cho
2005/0246109 A1 11/2005 Bang
2006/0259205 A1 11/2006 Krum
2007/0151772 A1* 7/2007 Wu ............................ 177/25.14
2008/0165022 A1 7/2008 Herz
2009/0153342 A1* 6/2009 Thorn ........................... 340/669
2010/0060604 A1* 3/2010 Zwart et al. ................... 345/173
2011/0087454 A1* 4/2011 Lee et al. ...................... 702/124

OTHER PUBLICATIONS

International Search Report for PCT/US2010/029239, May 19, 2010.
Written Opinion for PCT/US2010/029239, May 19, 2010.

* cited by examiner

*Primary Examiner* — Carol Tsai
(74) *Attorney, Agent, or Firm* — William A Blake

(57) ABSTRACT

A directional tap detection algorithm and a single tri-axis accelerometer are employed to extend the number of unique button less input commands available for a small mobile electronic device. The algorithm analyzes acceleration data from the tri-axis accelerometer to detect the direction and number of taps imparted to any of the six sides of a housing of the device, yielding 12 unique inputs. The algorithm employs a parameter referred to as the performance index (PI) to identify tap induced movements. The PI is determined by calculating the time derivative of each acceleration signal for each axis and then calculating the sum of the absolute values of the calculated acceleration derivatives. A tap is determined to have occurred if the sum exceeds a threshold value for a predetermined amount of time. If a second tap is detected within a predetermined time after the first tap, then a double tap is determined to have occurred.

14 Claims, 8 Drawing Sheets

DIRECTIONAL TAP DETECTION ALGORITHM USING AN ACCELEROMETER

CROSS REFERENCE TO RELATED APPLICATIONS

This application claims the benefit under 35 U.S.C. 119(e) of U.S. Provisional Application No. 61/164,784, filed Mar. 30, 2009, the disclosure of which is hereby incorporated by reference in its entirety.

BACKGROUND OF THE INVENTION

1. Field of the Invention

The present invention relates in general to a system and method in which a directional tap detection algorithm and a tri-axis accelerometer extend the number of unique buttonless inputs available for small mobile devices like cell phones and MP3 players. The algorithm analyzes acceleration data from the single accelerometer to detect the direction (X+, X−, Y+, Y−, Z+, Z−) and number (single or double) of taps, yielding 12 unique inputs.

2. Description of the Background Art

Mobile devices are getting smaller and smaller for portability these days. The reduction in size limits the space available for input devices (such as buttons and keypads). Many researchers have been studying gesture recognition to remove traditional input devices. In certain environments, a simple motion can be a more effective input. The advent of MEMS (Micro-Electro-Mechanical System) technology dramatically reduced the size of accelerometers which can detect an object's motion. Tapping is a very simple motion. It is intuitive and not necessary to learn. If tapping a device anywhere on its surface could be used to control the device, then it would be a unique input methodology.

Rudimentary tap detection typically allows for two distinct input commands. These are often referred to as tap and double tap. However, there is a need for proving a multiplicity of tap commands in the aforementioned small mobile devices.

SUMMARY OF THE INVENTION

The present invention addresses the foregoing need through use of a tap detection algorithm in combination with a three axis accelerometer which enable not only discrimination between single and double taps, but also discrimination based on direction of the tap(s). Careful analysis of the acceleration signatures of the taps allows for determining which face or side of the object was tapped (the direction of the tap). Including directional information expands the number of possible input commands available to 12, a six-fold improvement.

The system and method of the invention are particularly useful for generating buttonless inputs for small mobile electronic devices like cell phones and MP3 players. A variety of input commands can be created with the number and direction of the detected tap. For example, a menu can be scrolled up and down or an item in a menu can be selected. Since the accelerations caused by the tap are transmitted to the interior of the mobile device, the single sensor required for detecting these 12 unique inputs require no surface area on the outside of the mobile device.

Determination of the tap direction is accomplished through a detailed analysis of the acceleration data once a tap has been detected. A single tap is a blow to a particular device once with a part of the human body or a stylus. A double tap is two single taps in quick succession.

The accelerometer is located inside the device such that when the device is tapped, the shock is translated to accelerometer properly. Since the device can be tapped on any of its faces, the optimal location for the accelerometer is the center of the device. Using a 3-axis accelerometer, the device can be tapped on each face to provide 12 combinations of tap input events.

The shock of the tap is transmitted through the body of the device to the accelerometer when tapping occurs. The peak rises to a maximum within 0.005 sec and re-bounds slightly slower. The maximum acceleration reaches 0.5 g no matter which direction was tapped. The total acceleration means the magnitude of acceleration, $A_{total}=\sqrt{A_x^2+A_y^2+A_z^2}$ where: Ax: X-axis acceleration; Ay: Y-axis acceleration; and Az: Z-axis acceleration.

Sometimes the recoil can be over half the original peak, and the correlation with other axes can be seen. If the device is tapped in a particular direction, the other axes respond. Thus, all axes should be observed to know if a tap occurred.

A double tap means to hit the same spot twice in a row in quick succession. The second tap follows the first one in less than 0.5 second. Each individual tap does not show any acceleration difference from a single tap. The timing of the two taps determines whether the command was a double tap or two individual single taps.

A key feature of the algorithm is referred to as the performance index (PI) which is used to provide a characteristic signature of a tap event. The PI is the summation of the absolute values of the magnitude of each axis's jerk which results from a movement of the device, such as may be induced by a user tapping a side or face of the device. The jerk is the derivative of the acceleration with respect to time (i.e. the change in acceleration). Generally, jerk profiles give information about very quick and shaky movements. The absolute value is used to fully sum the dynamics on all axes. The performance index of a tap is distinctly above the level of the background noise. Thus, a threshold technique is then applied to the performance index to distinguish a possible tap event from noise. In addition, the length of time that the PI is above the threshold and the timing between two occurrences (or absence of a second PI peak) of high PI are used to distinguish between single and double taps.

Once a tap or double tap has been determined additional scrutiny provides the direction of the tap event. First, the axis which is the largest component of the performance index (which axis has the largest jerk) at the start of the tap is determined. The axis with the largest jerk coincides with the axis of the device along which the tap is applied. Finally, after the axis has been determined, the sign of the jerk on the tap axis is used to provide the tap direction information. If the peak goes negative, the tap is in the positive direction; otherwise it is in the negative direction.

In the foregoing manner, the present invention provides an apparatus and method which can detect 12 different tap commands. Thresholding of the performance index and timing considerations identify taps and distinguish between single or double taps providing two distinct commands. The maximum component of the initial performance index provides the tap axis which increases the number of distinct commands by a factor of three. Finally the initial sign of the jerk for the tap axis provides the tap direction giving an additional factor of two increase in the available commands.

In the preferred embodiment, a MEMS type 3 axis accelerometer chip is preferably disposed in the device to be controlled to implement the foregoing method. The accelerometer chip preferably includes its own dedicated processor that executes the foregoing tap detection algorithm and generates 12 outputs that are as used as input commands to the device's host processor. Alternatively, the host processor could be programmed itself to receive the 3 inputs from the accelerometer and execute the tap detection algorithm.

BRIEF DESCRIPTION OF THE DRAWINGS

The foregoing and other features and advantages of the present invention will become apparent from the following detailed description of a preferred embodiment thereof, taken in conjunction with the accompanying drawings, which are briefly described as follows.

DETAILED DESCRIPTION OF THE INVENTION

A more detailed description of a preferred embodiment of the present invention will now be presented. Initially, the process for identifying a tap is described. A single tap is a blow to a particular device once with a part of the human body or a stylus. A double tap is formed by two single taps in quick succession.

Figure 1:
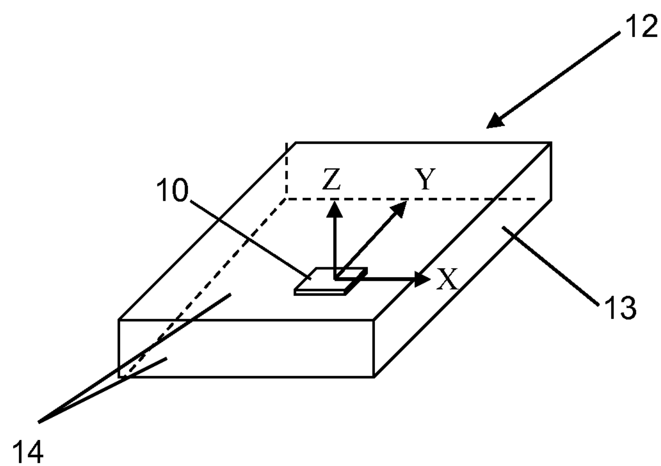
FIG. 1 is a schematic illustration of a device having an accelerometer chip disposed therein for detecting taps on different faces or sides of the device.

As illustrated in FIG. 1, a 3-axis (X, Y, Z) MEMS type accelerometer 10 is preferably mounted inside a device 12 to be controlled such that when the housing 13 of the device 12 is tapped on any of its six sides or faces 14, the shock is translated to accelerometer 10 properly. The device 12 can be any type of electronic device to be controlled which requires commands to be input thereto, but the invention is particularly suited for use with small mobile devices such as cell phones, MP3 players, etc. where the provision of command buttons is inherently limited by the size of the device.

Figure 2:
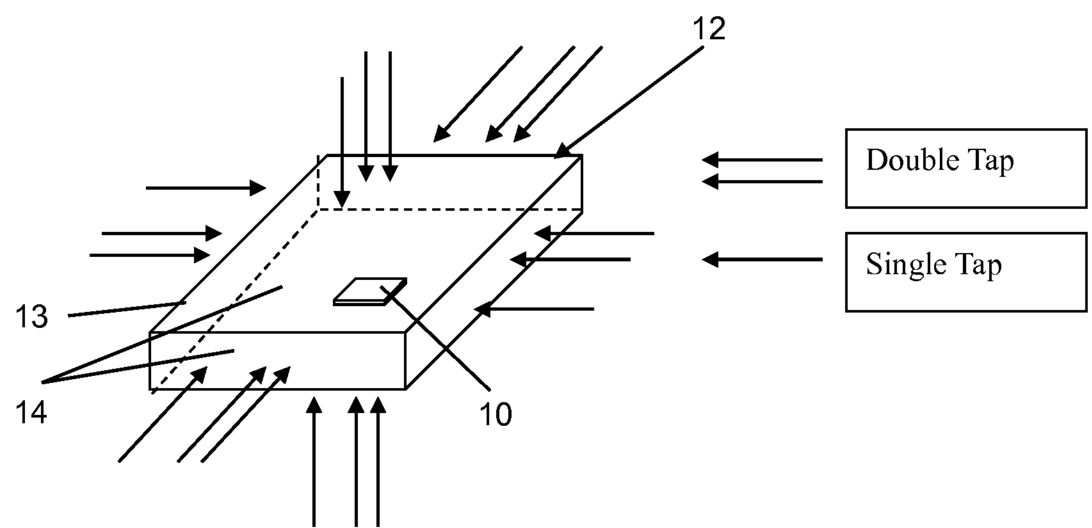
FIG. 2 is a schematic illustration of the device of FIG. 1 showing the 12 possible tap inputs that can be detected with the present invention.

Since the device 12 can be tapped on any of its six sides 14, the optimal location for the accelerometer 10 is the center of the device 12 with the 3 axis sensors of the accelerometer each arranged to be parallel to a corresponding pair of the six sides 14. FIG. 2 shows how the device 12 can be tapped on each side 14 in single and double taps to provide 12 combinations of tap input events.

The shock is transmitted through the body or housing 13 of the device 12 to the accelerometer 10 when tapping occurs. In tests on the preferred embodiment, the peak rises to the maximum within 0.005 sec and re-bounds slightly slower. The maximum acceleration reaches 0.5 g no matter which direction was tapped. The total acceleration means the magnitude of acceleration as determined by the following equation:

$$A_{total}=\sqrt{A_x^2+A_y^2+A_z^2} \quad \text{Equation 1}$$

In Equation 1, Ax=X-axis acceleration; Ay=Y-axis acceleration; and, Az=Z-axis acceleration.

Sometimes the recoil can be over half the original peak, and the correlation with other axes can be seen. If the device 12 is tapped in a particular direction, the other axes respond. All axes should be observed to know if a tap occurred.

A double tap means to hit the same spot twice in a row in quick succession. The second tap follows the first one in less than 0.5 second. Each individual tap does not show any acceleration difference from a single tap. The timing of the two taps determines whether the command was a double tap or two individual single taps.

A calculation referred to as the performance index (PI) is employed in the preferred embodiment to provide a characteristic signature of a tap event. The PI is the summation of the absolute value of each axis's jerk. The jerk is the derivative of the acceleration with respect to time (i.e. the change in acceleration). Generally, jerk profiles give information about very quick and shaky movements. The performance index is expressed in the following equation:

$$P.I. = \left|\frac{A_x}{dt}\right| + \left|\frac{A_y}{dt}\right| + \left|\frac{A_z}{dt}\right| = \sum_{i=x,y,z} \left|\frac{A_i}{dt}\right| \quad \text{Equation 2}$$

Figure 3:
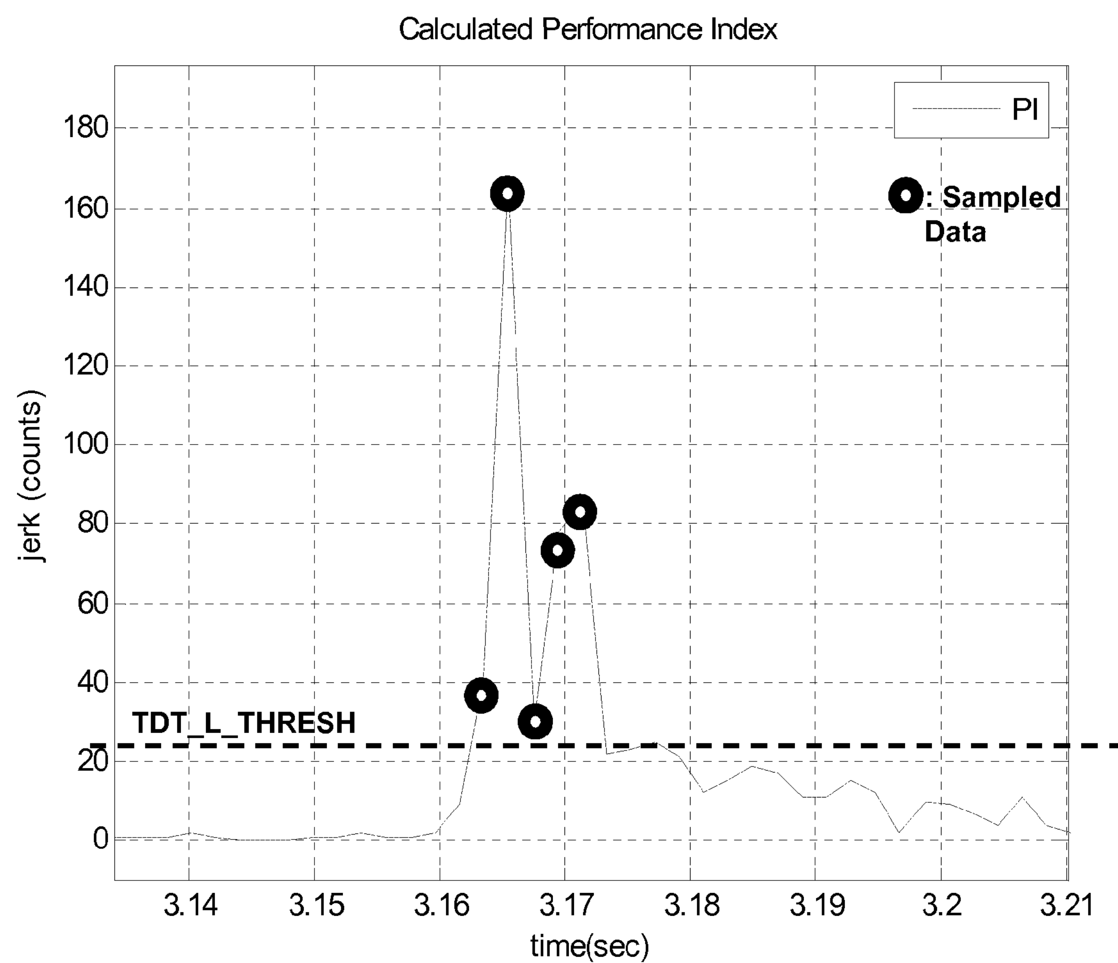
FIG. 3 is a graph depicting the magnitude of the performance index (PI) as a function of time, where PI is calculated by summing the absolute values of the jerks (derivative of acceleration) imparted along each axis of a the device by a tap as a function of time.

The absolute value is used to fully sum the dynamics on all axes. The performance index of a tap is distinctly above the level of the background noise. A threshold technique is thus applied to the PI to distinguish a possible tap event from noise. A tap event is detected when the previously described jerk summation exceeds the performance index lower threshold for a period of time that is more than the tap detection low limit, but less than the tap detection high limit. FIG. 3 shows an example of a single tap event meeting the performance index criteria. In FIG. 3, the performance index exceeds the performance index lower threshold (TDT_L_THRESH) for a number of time spaced samples, but less than the tap detection high limit as contained in TDT_FIRST_TIMER.

Figure 4:
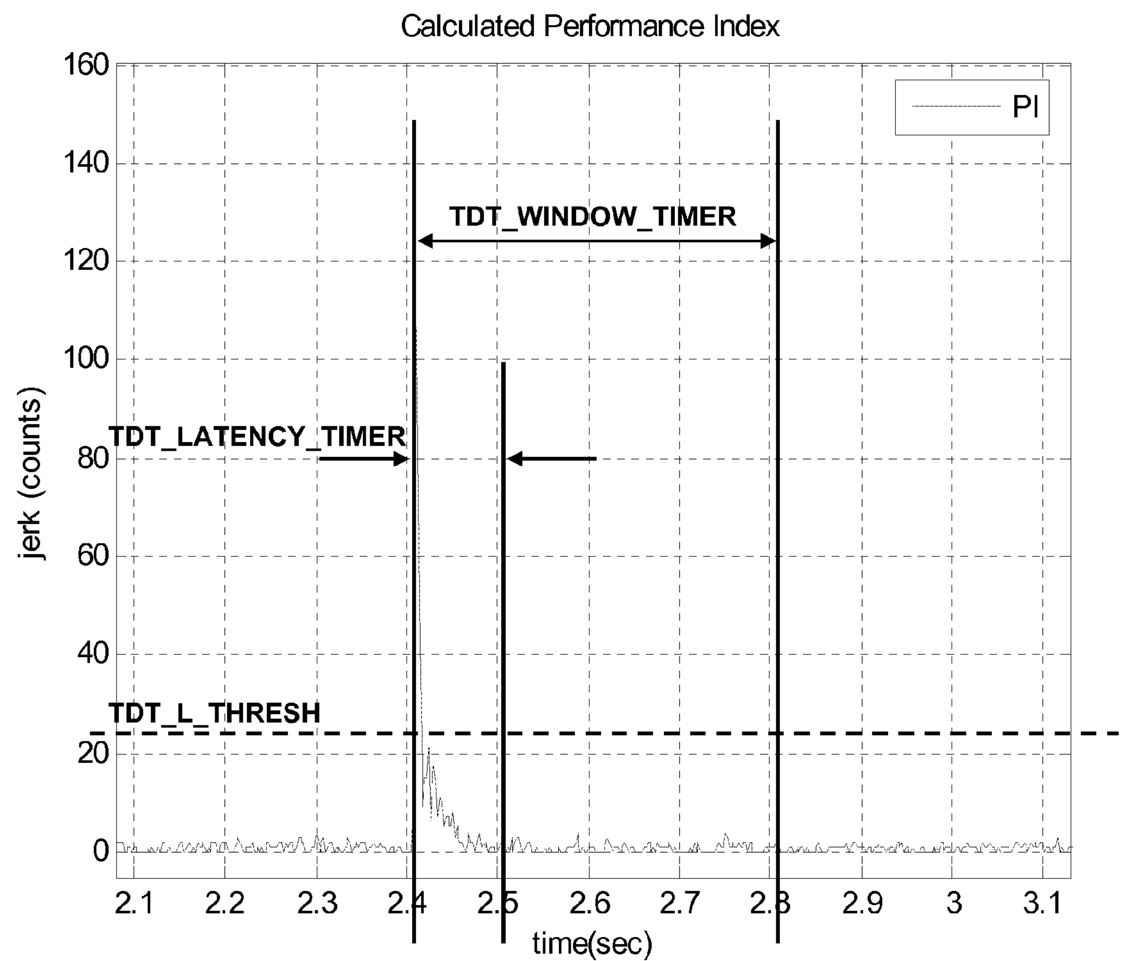
FIG. 4 is a graph depicting the PI as a function of time for a single tap on a device.

Further, the length of time that the PI is above the threshold and the timing between two occurrences (or absence of a second PI peak) of high PI distinguish between single and double taps. In the preferred embodiment, a latency timer sets the time period that a tap event will only be characterized as a single tap. A second tap has to occur outside of the latency timer. If a second tap occurs inside the latency time, it will be ignored as it occurred too quickly. The single tap will be reported at the end of a window timer. FIG. 4 shows a single tap event meeting the PI, latency and window requirements. The latency timer is referred to as TDT_LATENCY_TIMER while the window timer is referred to as TDT_WINDOW_TIMER.

Figure 5:
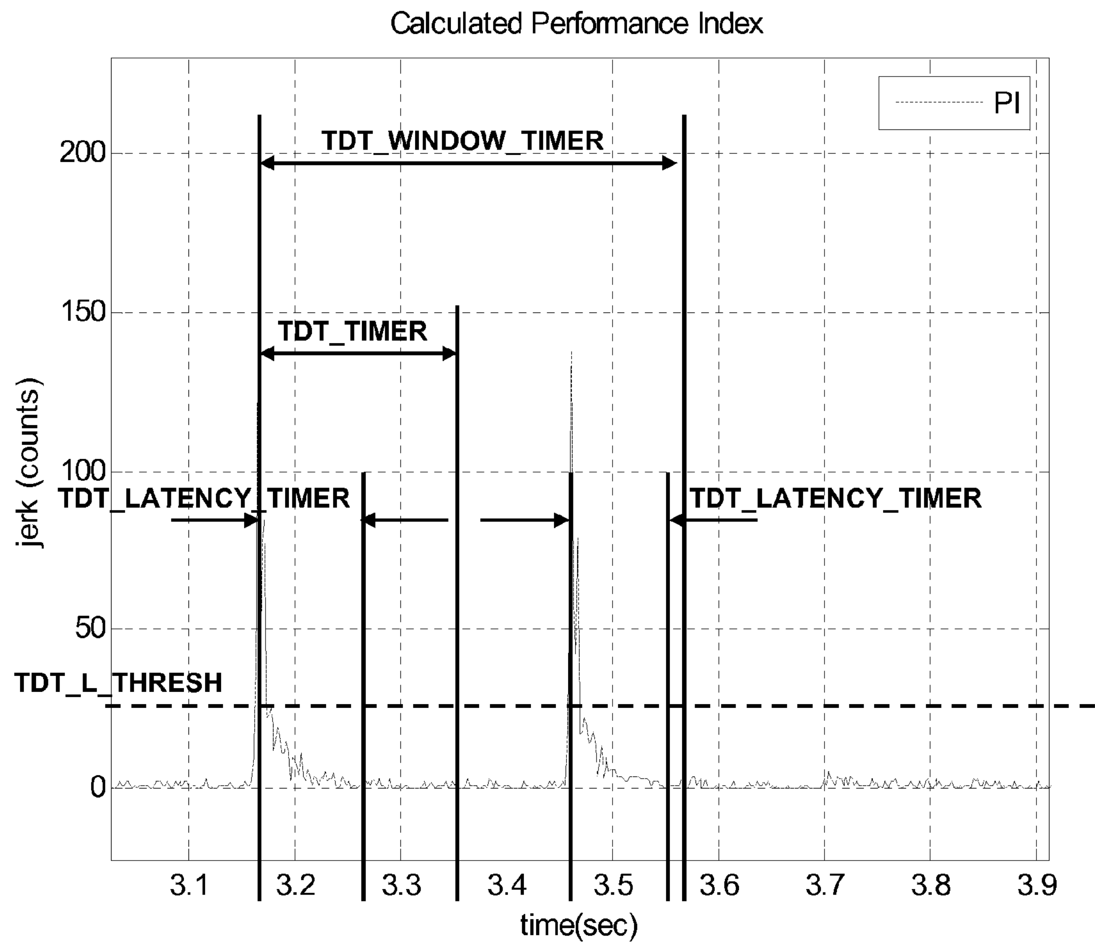
FIG. 5 is a graph depicting the PI as a function of time for a double tap on a device.

An event can be characterized as a double tap only if the second tap crosses the performance index lower threshold outside another timer referred to as the TDT_TIMER. This means that the TDT_TIMER determines the minimum time separation that must exist between the two taps of a double tap event. Similar to the single tap, the second tap event must exceed the performance index threshold for the time limit contained in the window timer. The double tap will be reported at the end of the second latency timer. FIG. 5 shows a double tap event meeting the PI, latency and window requirements. In FIG. 5, the second tap crosses the performance index low threshold (TDT_L_THRESHOLD) outside the TDT_TIMER. In addition, the second tap event exceeds TDT_L_THRESHOLD for the time limit contained in TDT_TAP_TIMER. The double tap will then be reported at the end of the second TDT_LATENCY_TIMER.

Once a tap or double tap has been determined, additional scrutiny provides the direction of the tap event. First, determination is made of which axis provides the largest component of the performance index (which axis has the largest jerk) at the start of the tap. The axis with the largest jerk coincides with the axis along which the tap is applied. As an example, when a device is tapped in X+ and X− direction, the X-axis is the most responsive axis and thus has the largest jerk magnitude as compared to the jerk magnitude for the Y and Z axes.

Figure 6:
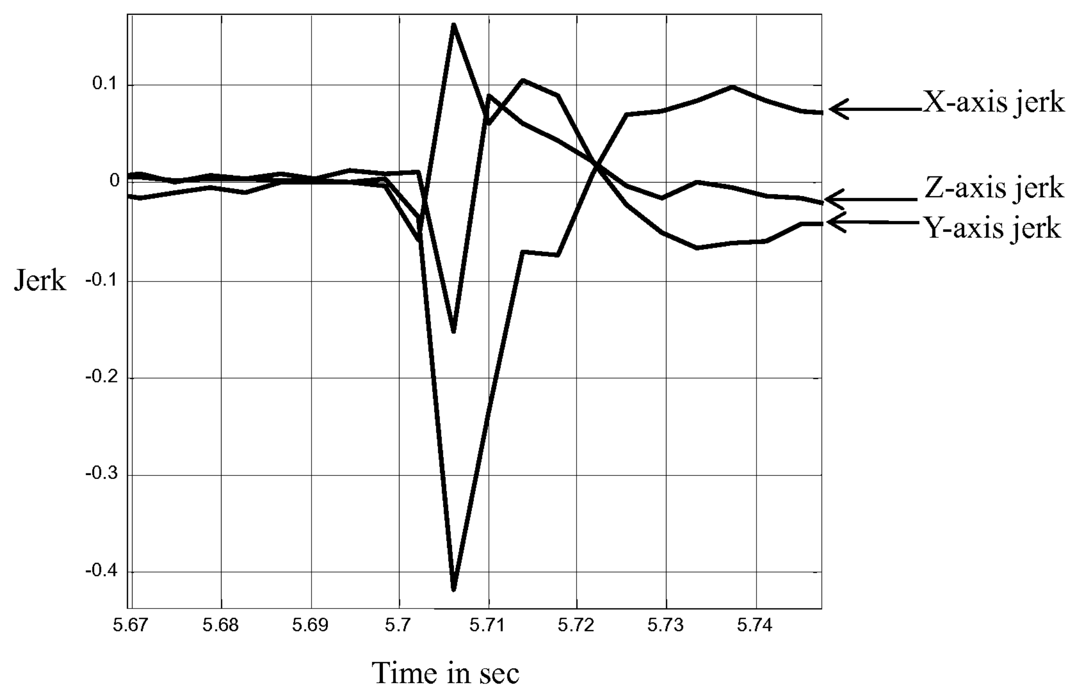
FIG. 6 is a graph depicting the jerk (acceleration derivative) magnitude as a function of time for each axis of the accelerometer in response to a single tap along the X axis of the device.

Once a tap has been detected and the axis has been determined, the sign of the jerk on the tap axis is used to provide the direction information. If the peak goes negative, the tap is in the positive direction; otherwise it is in the negative direction. The graph in FIG. 6 shows an expanded view of the jerk magnitude for each axis in response to a single tap. The X axis clearly contributes the largest component to the performance index indicating that the tap is on the X axis. The initial jerk is in the negative direction which is indicative of a tap on the positive X face of the device.

Thresholding of the performance index and timing considerations identify taps and distinguish between single or double tap providing two distinct commands. The maximum component of the initial performance index provides the tap axis which increases the number of distinct commands by a factor of three. Finally the initial sign of the jerk for the tap axis provides the tap direction giving an additional factor of two increase in the available commands.

Figure 7A:
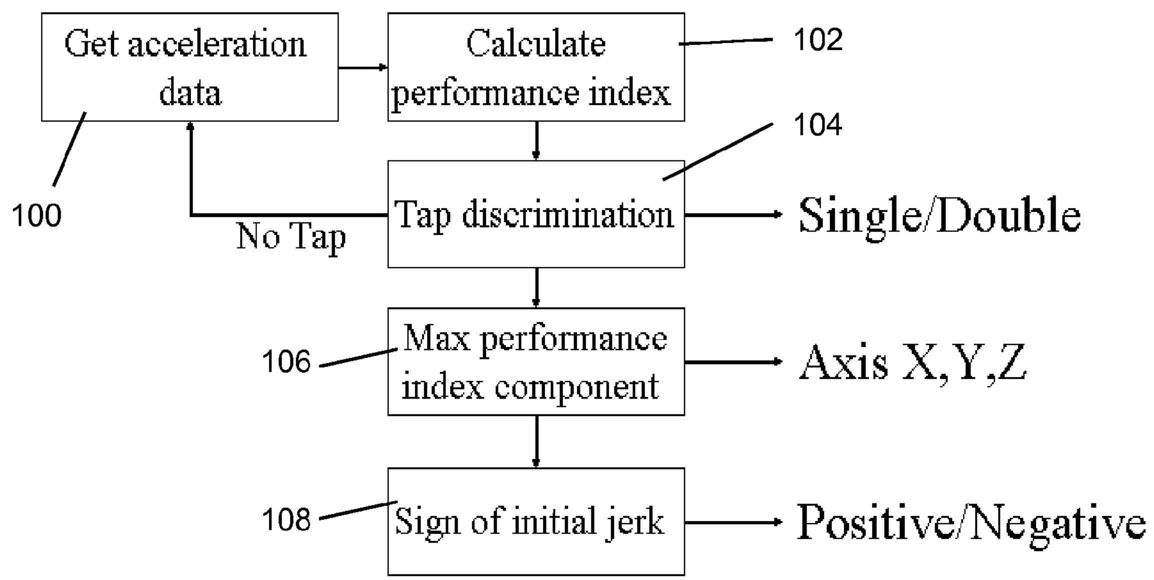
FIG. 7A is a block diagram of the general steps carried out by an algorithm employed in the method of the present invention to detect single and double taps on a device.
Figure 7B:
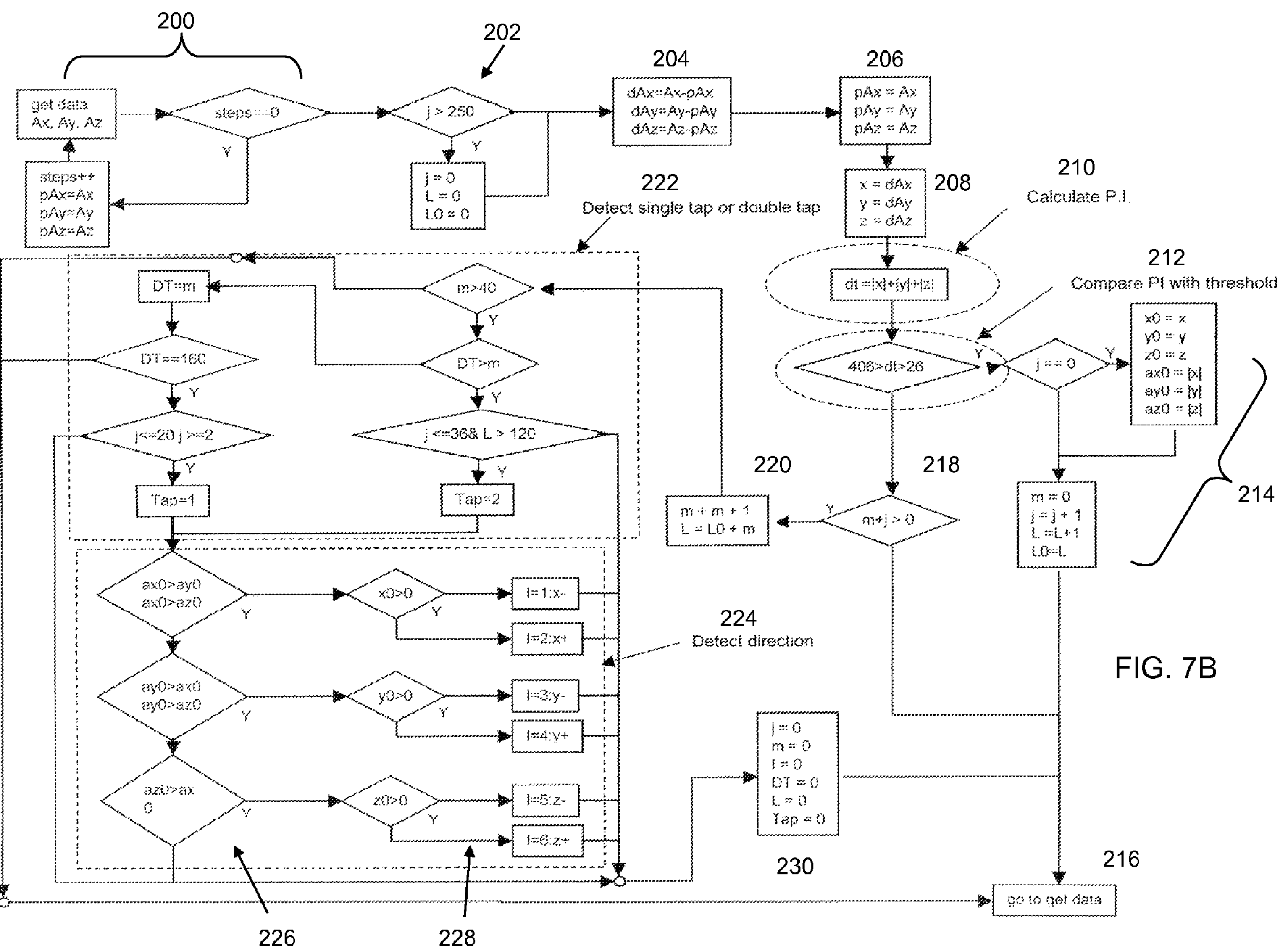
FIG. 7B is a block diagram of the detailed steps carried out by the algorithm of FIG. 7A.

The algorithm executed in the preferred embodiment of the present invention thus follows the steps in the flowchart in FIG. 7A. Four major functions based on the acceleration data are depicted. After acceleration data is obtained from the accelerometer in step 100, the first function is to calculate the performance index at step 102. The second function is the determination of a single or double tap event at step 104. The third function is to determine the axis along which the tap occurred based on the largest component to the performance index at step 106. Finally, the directional sign of the tap is determined at step 108 based on the sign of the initial jerk FIG. 7B is a detailed flowchart showing the details of how the foregoing steps of FIG. 7A are carried out in a preferred embodiment of the invention. In FIG. 7B, the following parameter values are employed:

Ax, Ay, Az: current acceleration readings;

pAx, pAy, pAz: previous acceleration readings;

dAx, dAy, dAz: difference between current and previous acceleration readings (jerk);

x, y, z: same as dAx, dAy, dAz (used to simplify notation);

dt: performance index;

x0, y0, z0: information about the initial jerk above the threshold (used for direction determination);

ax0, ay0, az0: information about the initial jerk above the threshold (used for axis determination);

j: timing counter for how long the performance index is above the threshold;

m: timing counter for how long the performance index is below the threshold;

L: total time counter since the start of the first tap event; and

DT: double tap time window.

With specific reference to the flow chart in FIG. 7B, a first group of steps 200 is executed at start-up to load the first acceleration data received from the accelerometer into the previous acceleration data. Steps 202 are then executed to check the timer value j for an over-run condition. If this is detected, the timer value is reset to 0. Next, the difference between current and previous acceleration values is calculated at step 204. These difference values are the amount of jerk (acceleration derivative) detected along each of the 3 axes, X, Y and Z. The acceleration readings are then updated by setting the previous acceleration readings to the current readings at step 206.

After the jerk values are updated at step 208, the PI is then calculated at step 210 using Equation 2 discussed previously. The PI is then compared to lower and upper threshold values at step 212. If the PI is between the two threshold values, and the timer value j=0, then this is an indication of a first jerk greater than threshold, which may be in response to a single or double tap event. The group of steps 214 is executed to store the acceleration information for later axis and direction determination if in fact a single or double tap is detected. Also, the various timing counters are then updated and at step 216, the process returns to the beginning (steps 200) and the next sampled acceleration data is retrieved for the same analysis.

At some point, the PI value will drop below the lower threshold if a tap has in fact occurred. If this occurs when the sum of the m and j timer values exceeds 1 at step 218, then the timer values are updated at step 220. Next, a series of timer analysis steps 222 are carried out to determine if a single or a double tap has occurred. If either m is not greater than 40 or DT is not greater than m, then an analysis is carried out to determine if a single tap has been detected. This is determined to be the case if the PI was above the lower threshold for a timing count of between 2 and 20 and the double tap timing window value has reached 160, which confirms that a second tap has not occurred. A double tap has occurred if the PI has been below threshold for a timer count of at least m>40, the double tap time window DT is greater than m, the PI was above the lower threshold for a timer value j>m; and, the total time counter L since the start of the first tap event is greater than 120.

Once either a single or a double tap has been detected, the algorithm next executes a series of direction determination steps 224 that determine the one of the three axes X, Y and Z along which the tap has occurred and the direction along the axis. This is determined simply by comparing the magnitudes of the acceleration values along the three axes and identifying the axis of the tap to be the one with the greatest acceleration magnitude in steps 226. Finally, during steps 228, the direction of the tap is detected by determining whether the detected acceleration was positive (>0) or negative (<0). The analysis is then complete, the various timer and other values are reset at step 230 and the process starts over again at steps 200.

Figure 8:
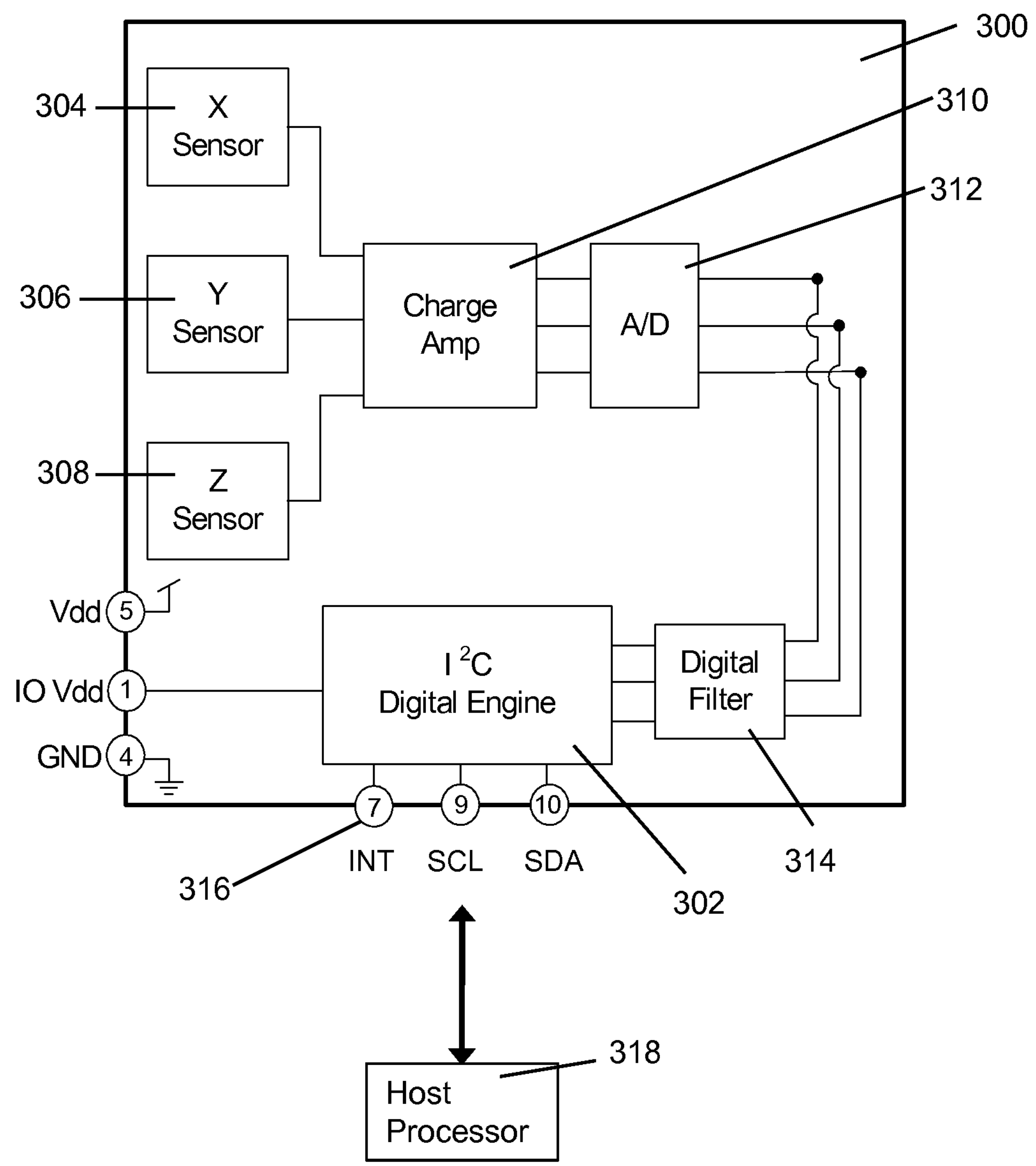
FIG. 8 is a block diagram of an accelerometer chip employed in the preferred embodiment of the present invention.

FIG. 8 is a block diagram showing the details of a 3-axis accelerometer chip 300 that is configured in accordance with the preferred embodiment of the invention. The logic that implements the algorithm of FIG. 7B is contained in an accelerometer processor (in the preferred embodiment, an $I^2C$ Digital Engine) 302. The tap detection feature of the processor 302 recognizes single and double tap inputs and reports the acceleration axis and direction along which each tap occurred. Eight performance parameters as discussed above, as well as a user-selectable ODR, are used to configure the processor 302 for a desired tap detection response.

The accelerometer processor 302 receives inputs from X, Y and Z axis g-force sensors 304, 306 and 308, respectively. Each of the sensors 304, 306 and 308 generates an analog output signal that is conditioned by being passed through a charge amp 310, an ND converter 312 and a digital filter 314 before being input to the processor 302. When the processor 302 receives a signal indicating an acceleration event, such as a tap, a signal on an interrupt pin (INT) 316 of the processor 302 goes high. When that interrupt is recognized by a host processor (device processor) 318, the host processor 318 will then read interrupt status registers (via $I^2C$ communications) in the accelerometer processor 302 to obtain the information about the tap event.

The status registers in the accelerometer processor 302 include the following. There are two interrupt source registers that report function state changes. This data is updated when a new state change or event occurs and each applications result is latched until the interrupt release register is read. The first register, referred to as INT_SRC_REG1, reports which axis and direction detected a single or double tap event, per Table 1. Note that multiple axes can sense tap events, so more than one bit may be set at a time.

| R | R | R | R | R | R | R | R |
|---|---|---|---|---|---|---|---|
| 0 | 0 | TLE | TRI | TDO | TUP | TFD | TFU |
| Bit7 | Bit6 | Bit5 | Bit4 | Bit3 | Bit2 | Bit1 | Bit0 |

$I^2C$ Address: 0x15h

TABLE 1

| Tap Double Tap Reporting | |
|---|---|
| Bit | Description |
| TLE | X Negative (X−) Reported |
| TRI | X Positive (X+) Reported |
| TDO | Y Negative (Y−) Reported |
| TUP | Y Positive (Y+) Reported |
| TFD | Z Negative (Z−) Reported |
| TFU | Z Positive (Z+) Reported |

The second register, known as INT_SRC_REG2, reports which function caused an interrupt. Reading from the interrupt release register can clear the entire contents of this register.

| R | R | R | R | R | R | R | R |
|---|---|---|---|---|---|---|---|
| 0 | 0 | 0 | DRDY | TDTS1 | TDTS0 | WUFS | TPS |
| Bit7 | Bit6 | Bit5 | Bit4 | Bit3 | Bit2 | Bit1 | Bit0 |

$I^2C$ Address: 0x16h

DRDY indicates that new acceleration data is available. This bit is cleared when acceleration data is read or the interrupt release register is read so that when DRDY=0, new acceleration data not available and when DRDY=1, new acceleration data is available. TDTS1, TDTS0 reflects if a Tap Double Tap event was detected per Table 2. TPS reflects the status of the tilt position function. TPS=0 indicates the tilt position state has not changed, while TPS=1 indicates the tilt position state has changed.

TABLE 2

| Tap Double Tap Event Description | | |
|---|---|---|
| TDTS1 | TDTS0 | Event |
| 0 | 0 | No Tap |
| 0 | 1 | Single Tap |
| 1 | 0 | Double Tap |
| 1 | 1 | DNE |

The register known as STATUS_REG reports the status of the interrupt.

| R | R | R | R | R | R | R | R |
|---|---|---|---|---|---|---|---|
| 0 | 0 | 0 | INT | 0 | 0 | 0 | 0 |
| Bit7 | Bit6 | Bit5 | Bit4 | Bit3 | Bit2 | Bit1 | Bit0 |

$I^2C$ Address: 0x18h

INT reports the combined interrupt information of all enabled functions. This bit is released to 0 when the interrupt source latch register (1Ah) is read. INT=0 indicates no interrupt event, while INT=1 indicates an interrupt event has occurred.

The register INT_REL is used to release interrupts. In particular, latched interrupt source information (INT_SRC_REG1 and INT_SRC_REG2), the status register, and the physical interrupt pin (7) are cleared when reading this register.

| R | R | R | R | R | R | R | R |
|---|---|---|---|---|---|---|---|
| X | X | X | X | X | X | X | X |
| Bit7 | Bit6 | Bit5 | Bit4 | Bit3 | Bit2 | Bit1 | Bit0 |

$I^2C$ Address: 0x1Ah

Although the invention has been disclosed in terms of a preferred embodiment and variations thereon, it will be understood that numerous additional modifications and variations could be made thereto without departing from the scope of the invention as set forth in the following claims. For example, the preferred embodiment employs an accelerometer chip that includes its own dedicated processor for executing the tap detection algorithm, however, the controlled device's host processor could itself be programmed to receive the 3 inputs from the accelerometer and execute the tap detection algorithm.

What is claimed is:

1. A processor-implemented method for detecting tap inputs on a device based on first, second and third axis outputs from a three axis accelerometer attached to said device, said processor being programmed to carry out the steps of:

detecting acceleration signals generated by said first, second and third axis outputs of said three-axis accelerometer caused by movement of said device;

for each of said as outputs, calculating the derivative of each acceleration signal as a function of time;

determining whether said movement of the device is caused by a tap input on a housing of said device by calculating the sum of the absolute values of said acceleration derivatives along each axis of said three axis accelerometer resulting from said movement and determining that said movement is a tap input if the sum of said absolute values exceeds a threshold value for a predetermined amount of time;

determining the axis of said tap by determining which output of said three axis accelerometer generated the acceleration derivative with the largest magnitude;

determining the direction of the tap by determining the sign of the acceleration derivative with the largest magnitude; and employing the determined tap axis and direction to generate an input command to control operation of said device.

2. The processor-implemented method of claim 1, further including the step of determining whether movement of said device is caused by a double tap.

3. The processor-implemented method of claim 2, wherein 12 different input commands are generated, 4 for each of said three axes, two of which are based on the determined direction of the tap and two of which are determined based on whether a single or a double tap is detected.

4. The processor-implemented method of claim 2, wherein the step of determining whether movement of said device is caused by a double tap comprises determining that said movement is a double tap input if said the sum of said absolute values of said acceleration derivatives along each axis of said accelerometer resulting from said movement exceeds a threshold value for a first predetermined amount of time, falls below said threshold value and then exceeds said threshold value for a second predetermined amount of time which begins within a third predetermined amount of time after said value falls below said threshold value.

5. The processor-implemented method of claim 4, wherein 12 different input commands are generated, 4 for each of said three axes, two of which are based on the determined direction of the tap and two of which are determined based on whether a single or a double tap is detected.

6. The processor-implemented method of claim 1, wherein said accelerometer is centrally located inside said device.

7. The processor-implemented method of claim 1, wherein said device is a mobile device, such as a cell phone or an MP3 player.

8. A system for providing buttonless input commands to a mobile electronic device comprising:

a three axis accelerometer attached to said device;

an accelerometer output processor interfaced to first, second and third outputs of said three axis accelerometer and a device processor which controls operation of said device, said accelerometer output processor being programmed with an algorithm which carries out the steps of:

detecting acceleration signals generated by said first, second and third outputs of said three axis accelerometer caused by movement of said device;

for each of said outputs, calculating the derivative of each acceleration signal as a function of time;

determining whether said movement of the device is caused by a tap input on a housing of said device by calculating the sum of the absolute values of said acceleration derivatives along each axis of said three axis accelerometer resulting from said movement and determining that said movement is a tap input if the sum of said absolute values exceeds a threshold value for a predetermined amount of time;

determining an axis of said tap by determining which output of said three axis accelerometer generated the acceleration derivative with the largest magnitude;

determining the direction of the tap by determining the sign of the acceleration derivative with the largest magnitude; and communicating with said device processor information regarding the axis and direction of the tap so that said device processor can use said information as an input command.

9. The system of claim 8, wherein said algorithm further includes the step of determining whether movement of said device is caused by a double tap.

10. The system of claim 9, wherein 12 different input commands are generated, 4 for each of said 3 axes, two of which are based on the determined direction of the tap and two of which are determined based on whether a single or a double tap is detected.

11. The system of claim 9, wherein the step of determining whether movement of said device is caused by a double tap comprises determining that said movement is a double tap input if said the sum of said absolute values of said acceleration derivatives along each axis of said accelerometer resulting from said movement exceeds a threshold value for a first predetermined amount of time, falls below said threshold value and then exceeds said threshold value for a second predetermined amount of time which begins within a third predetermined amount of time after said value falls below said threshold value.

12. The system of claim 11, wherein 12 different input commands are generated, 4 for each of said 3 axes, two of which are based on the determined direction of the tap and two of which are determined based on whether a single or a double tap is detected.

13. The system of claim 8, wherein said accelerometer is centrally located inside said device.

14. The system of claim 8, wherein said device is a mobile device, such as a cell phone or an MP3 player.

* * * * *